United States Patent
Ravishankar et al.

(10) Patent No.: US 10,932,268 B2
(45) Date of Patent: Feb. 23, 2021

(54) NEXT GENERATION MOBILE SATELLITE SYSTEM AND GATEWAY DESIGN

(71) Applicant: HUGHES NETWORK SYSTEMS, LLC, Germantown, MD (US)

(72) Inventors: Channasandra S. Ravishankar, Germantown, MD (US); John Corrigan, Germantown, MD (US); Gaguk Zakaria, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/415,959

(22) Filed: May 17, 2019

(65) Prior Publication Data

US 2019/0320439 A1    Oct. 17, 2019

Related U.S. Application Data

(63) Continuation of application No. 15/835,229, filed on Dec. 7, 2017, now Pat. No. 10,397,926.

(Continued)

(51) Int. Cl.
| | |
|---|---|
| *H04W 72/04* | (2009.01) |
| *H04B 7/185* | (2006.01) |
| *H04L 29/06* | (2006.01) |
| *H04W 80/00* | (2009.01) |
| *H04W 84/06* | (2009.01) |
| *H04L 29/08* | (2006.01) |
| *H04W 72/12* | (2009.01) |

(52) U.S. Cl.
CPC .... *H04W 72/0453* (2013.01); *H04B 7/18532* (2013.01); *H04B 7/18539* (2013.01); *H04L 69/18* (2013.01); *H04L 69/323* (2013.01); *H04B 7/18519* (2013.01); *H04W 72/12* (2013.01); *H04W 80/00* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 9,026,121 | B2 * | 5/2015 | Cook | H04M 11/062 455/450 |
| 2004/0052273 | A1 * | 3/2004 | Karaoguz | H04L 47/2408 370/465 |

(Continued)

OTHER PUBLICATIONS

International Search Report in PCT/US2017/065186, dated Mar. 1, 2018.

(Continued)

*Primary Examiner* — Hong S Cho
(74) *Attorney, Agent, or Firm* — Jones Robb, PLLC

(57) ABSTRACT

An apparatus for establishing communication between a base station and different generation terminals includes a multi-protocol stack capable of processing user traffic received from different generation terminals. The apparatus also includes a common physical layer that receives user traffic from different generation terminals and identifies the generation of the terminal sending the user traffic. The user traffic is then processed and routed based on the terminal generation. Traffic can be prioritized across current and legacy terminal types based on a variety of factors.

26 Claims, 11 Drawing Sheets

Related U.S. Application Data

(60) Provisional application No. 62/431,410, filed on Dec. 7, 2016.

(56) References Cited

U.S. PATENT DOCUMENTS

| | | |
|---|---|---|
| 2006/0148483 A1 | 7/2006 | Howard et al. |
| 2011/0021216 A1 | 1/2011 | Pudney et al. |
| 2011/0200045 A1 | 8/2011 | Baehre |
| 2012/0110192 A1 | 5/2012 | Lu et al. |
| 2013/0235871 A1 | 9/2013 | Brzozowski et al. |
| 2015/0052360 A1 | 2/2015 | Ravishankar et al. |
| 2015/0163628 A1* | 6/2015 | Beattie .............. H04W 28/0231 455/456.3 |
| 2016/0037434 A1* | 2/2016 | Gopal ..................... H04L 45/02 370/316 |
| 2016/0127889 A1* | 5/2016 | Cui ....................... H04W 4/029 370/328 |
| 2017/0019800 A1* | 1/2017 | Liu ................... H04W 72/0446 |
| 2017/0230818 A1* | 8/2017 | Park ........................ H04W 8/02 |
| 2018/0160311 A1* | 6/2018 | Shaw ................. H04L 61/2007 |

OTHER PUBLICATIONS

European Search Report issued in corresponding Application No. 17877520.1, dated Jul. 22, 2020.

* cited by examiner

NEXT GENERATION MOBILE SATELLITE SYSTEM AND GATEWAY DESIGN

CROSS-REFERENCE TO RELATED APPLICATION

This application is a Continuation of U.S. application Ser. No. 15/835,229, filed Dec. 7, 2017, which is a Non-Provisional of U.S. Provisional Patent Application Ser. No. 62/431,410 filed Dec. 7, 2016, the entire disclosure of which is incorporated herein by reference.

BACKGROUND INFORMATION

Recent developments in satellite communications have increased availability and reduced service costs, thereby making such technology more accessible to consumers. Satellite communication systems allow consumers to access voice and data services from virtually any global location. Such accessibility can be beneficial for consumers who are located in, or must travel to, areas that cannot be reliably serviced by normal voice and/or data communication systems.

Despite the increased availability, satellite communication does not incorporate a high variety of devices or upgrades commonly associated with other types of mobile communications. Subscribers to satellite communication services often keep terminals for many years due, at least in part, to the high costs associated with the purchase of new equipment and the lack of purchasing incentives. As advancements in mobile communication technologies become more standardized, it can be necessary to discontinue services directed to older, or legacy, terminals. For example, as certain protocols are standardized and deployed, backward compatibility may not exist for legacy devices. Service providers sometimes continue supporting older technologies by allocating some spectrum and corresponding hardware. Service providers, however, are often reluctant to sacrifice existing spectrum for older devices over extended periods of time for various reasons. For example, newer technologies can be more efficient or cost-effective to the service provider. The spectrum may also be desired to offer services available only with newer generation protocols, thus forcing subscribers to upgrade to newer equipment or cancel their service. Based on the foregoing, it would be beneficial if satellite communication systems could integrate the use of current and legacy terminals without the need for dedicated spectrum and expensive hardware to legacy devices.

BRIEF SUMMARY

An apparatus and method for establishing communication between a base station and different generation terminals, are described. According to an embodiment, the apparatus includes: a multi-protocol stack for processing user data using different protocols; and a common physical layer configured to: receive user traffic from terminals of different types in a satellite communication system, identify a type associated with each terminal, and route the user traffic to the multi-protocol stack based, at least in part, on the terminal type, wherein the multi-protocol stack configured to forward the user traffic to a core network corresponding to the terminal type, and wherein the terminal type is determined based on utilization of a current generation protocol or a legacy protocol of at least one prior generation.

According to another embodiment, the apparatus includes: a multi-protocol stack configured to: process user traffic received from a plurality of core networks of different types, based at least in part, on the core network type, and add a generation SAPI tag in an address field of data packets contained in the user traffic, the generation SAPI tag being based on the core network type from which the user traffic was received; and a common physical layer configured to: receive the user traffic from the multi-protocol stack, remove the generation SAPI tag from data packets contained in the user traffic, and forward the user traffic to terminals, in a satellite communication system, having a type corresponding to the generation SAPI tag, wherein the terminal type is based on utilization of a current generation protocol or a legacy protocol of at least one prior generation.

According to an embodiment, the method includes: receiving user traffic in a satellite communication system from terminals of different types through a common physical layer; identifying a type associated with each terminal; routing the user traffic to a multi-protocol stack based, at least in part, on the terminal type; and forwarding the user traffic from the multi-protocol stack to a core network corresponding to the terminal type, wherein the terminal type is determined based on utilization of a current generation protocol or a legacy protocol of at least one prior generation.

According to another embodiment, the method includes: receiving user traffic, at a multi-protocol stack of a satellite network base station, from a plurality of core networks of different types based, at least in part, on the core network type; adding a generation SAPI tag in an address field of data packets contained in the user traffic, the generation SAPI tag being based on the core network type from which the user traffic was received; directing the user traffic to a common physical layer; forwarding the user traffic to terminals having a type corresponding to the generation SAPI tag, wherein the generation SAPI tag is removed prior to forwarding the user traffic to the terminals, and wherein the terminal type is based on utilization of a current generation protocol or a legacy protocol of at least one prior generation.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus and method for establishing communication between a base station and different generation terminals, are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
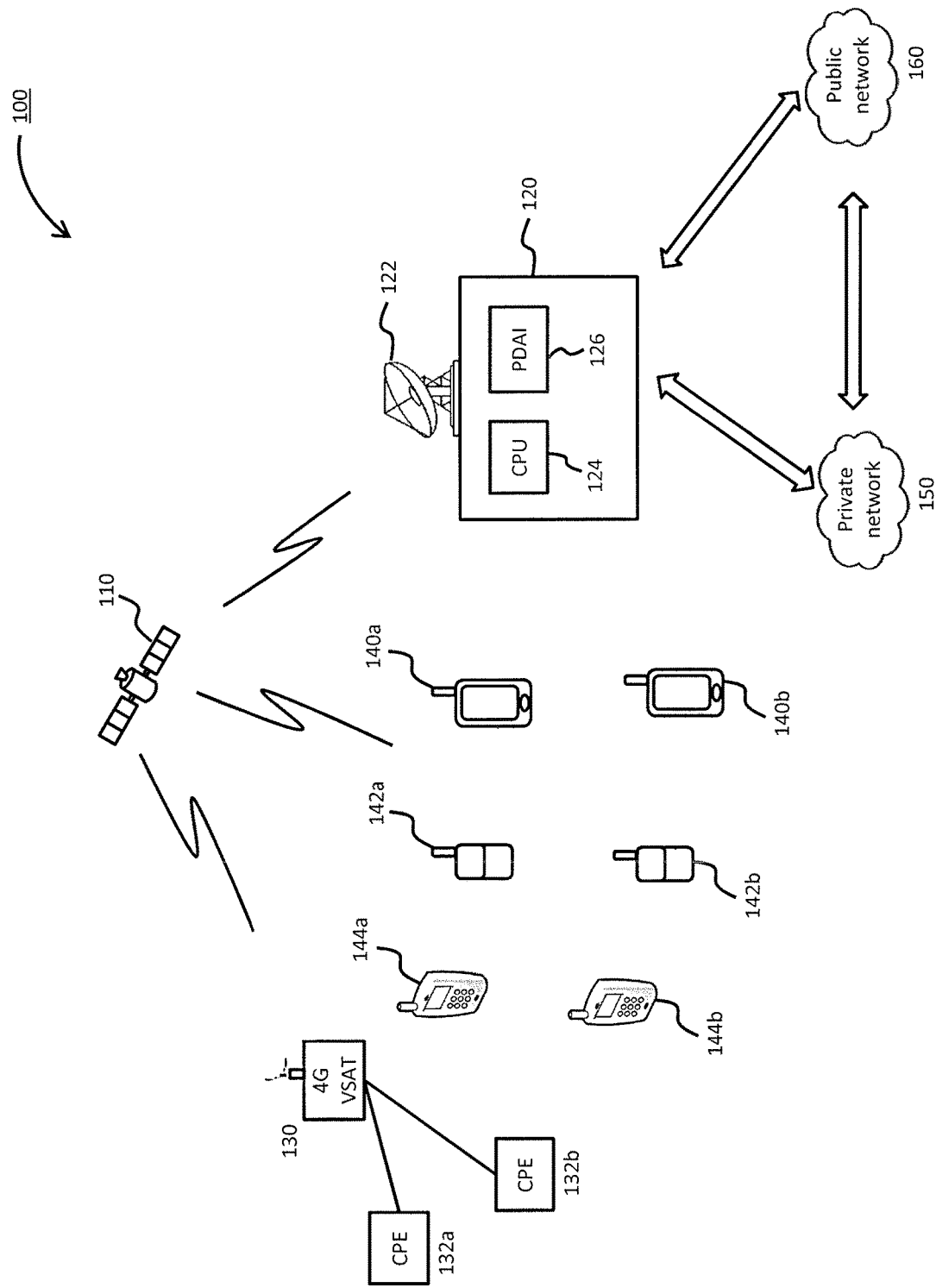
FIG. 1 is a diagram of a system capable of providing integrated voice and data services, according to one embodiment.

FIG. 1 is a diagram illustrating a satellite communication system 100 capable of providing integrated voice and data services, in accordance with an embodiment. The communication system 100 includes a satellite 110 that supports communications among a number of base stations 120 (only one shown) and multiple user terminals. The base station 120 includes various components necessary to facility communication with the satellite 110, as well as external networks. The base station 120 can include, for example, a radio frequency (RF) antenna 122 for transmitting and receiving signals to and from the satellite 110. One or more processing units (or CPUs) 124 can be included in the base station for controlling and managing various aspects of normal operations. The CPU 124 can also be embodied as a personal computer, laptop, server, etc. While generically illustrated, the CPU 124 is intended to encompass all such configurations. The base station 120 can further include a packet data air interface (PDAI) 126 which facilitates signal exchange and processing with the satellite as well as external core networks. Although not illustrated, the base station 120 can include additional hardware and software components that support normal operations. The term "base station" corresponds to gateway, and thus may be used interchangeably.

According to the illustrated embodiment, the base station 120 is capable of communicating with a fixed satellite terminal 130 which supports voice and data services from various customer premise equipment 132a, 132b (i.e., user devices). Depending on the specific embodiment, the customer premise equipment 132 can be a desktop computer, laptop, tablet, cell phone, etc. Connected appliances such as refrigerators, thermostats, etc. that incorporate embedded circuitry for network communication can also be supported by the satellite terminal. The network of such devices is commonly referred to as the internet of things (IoT). As used herein, the term satellite terminal (or simply terminal) corresponds to various types of satellite terminals that are used to communicate directly with the satellite. For example, the terminal can be fixed (small, medium, or large) or mobile (e.g., mobile handset). The terms user terminal, satellite terminal, terminal are used interchangeably to identify any of the foregoing types.

The satellite terminal 130 can be configured for relaying traffic between its customer premise equipment (CPEs) 132a, its private network 150, and/or a public network 160 such as the internet. According to the illustrated embodiment, the satellite terminal 130 is a 4G type terminal, where "4G" refers to the generation of hardware, software, and protocols implemented therein. Prior generations of protocols include 2.5G, 3G, etc. FIG. 1 further illustrates multiple mobile user terminals. According to one or more embodiments, the satellite communication system 100 is capable of communicating with terminals of prior and current generations. Specifically, user terminals 140a and 140b represent 4G devices, user terminals 142a and 142b represent 3G devices, and user terminals 144a and 144b represent 2.5G devices. As illustrated in FIG. 1, user terminals 140 (or 4G terminals) are current generation devices, whereas the 3G terminals 142 and 2.5G terminals represent legacy devices of two different generations. While FIG. 1 illustrates the 4G terminals 140 as current generation, and 2.5G terminals and 3G terminals as legacy devices, features of the embodiments described herein are also capable of accommodating future generations of the devices. Thus, as the number of generations increase, the "current" generation device would change, and the number of generations of "legacy" devices would increase. For example, if 6G terminals represent the current generation of devices, there would be four generations of legacy devices, namely 2.5G, 3G, 4G, and 5G.

The base station 120 can be configured to route this traffic across the private network 150 and public network 160 as appropriate. The base station 120 can be further configured to route traffic from the private network 150 and public network 160 (internet) across the satellite link to the appropriate terminal 130. The terminal 130 then routes the traffic to the appropriate customer premise equipment (CPE) 132. Similarly, the base station 120 can be configured to route traffic from the private network 150 and public network 160 (internet) across the satellite link to the appropriate 4G terminal 140, 3G terminal 142, and 2.5G terminal 144.

Figure 2:
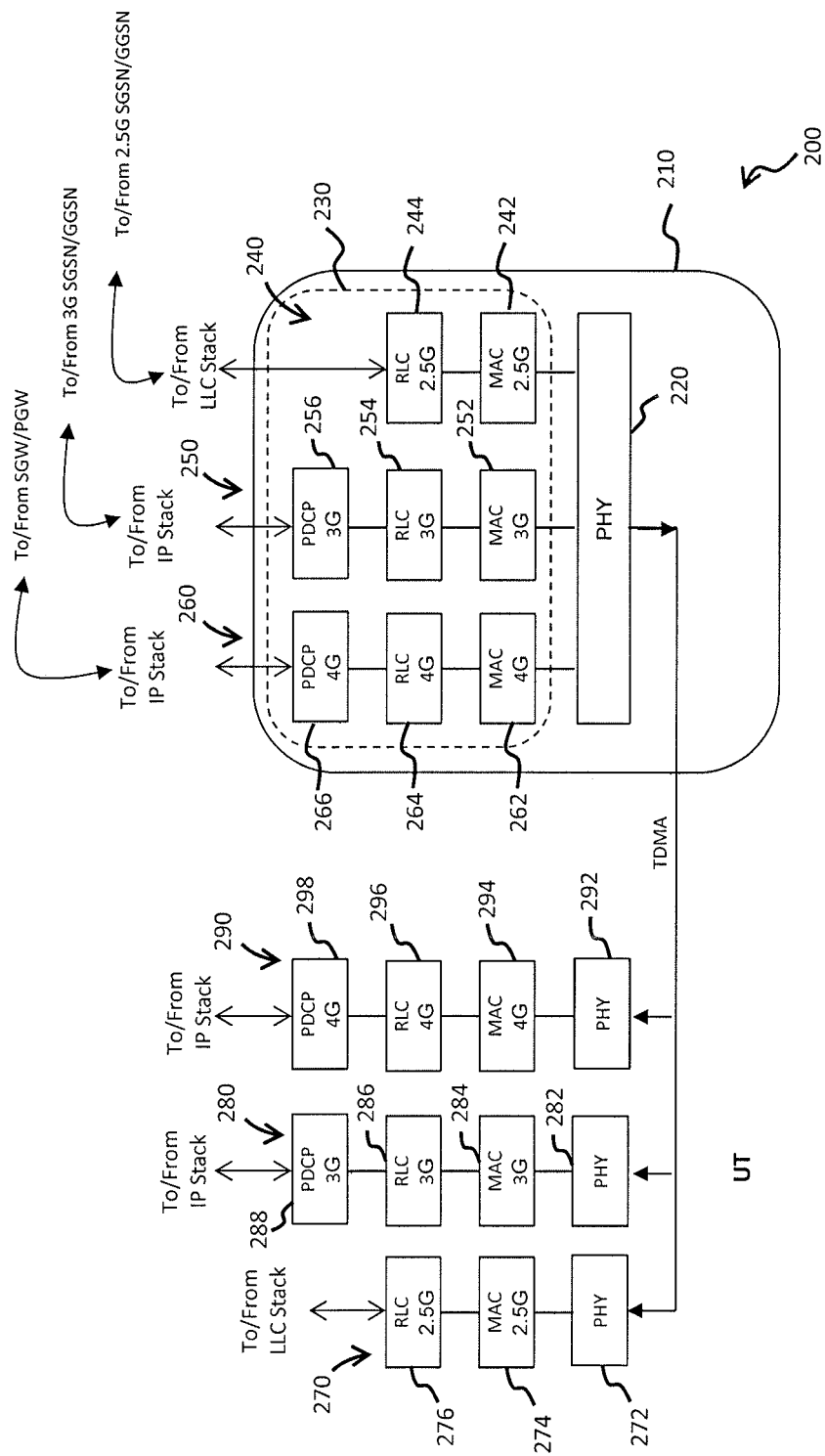
FIG. 2 is a diagram illustrating details of components for establishing communication between a base station and different generation terminals, in accordance with one or more embodiments.

FIG. 2 illustrates various details of an embodiment that supports communication between a base station 200 and multiple user terminals. According to the illustrated embodiment, the base station 200 includes a packet data air interface (PDAI) 210 that functions as an interface for communication signals between the base station 200 and various user terminals. The PDAI 210 can include, for example, a common physical layer 220, and a multi-protocol stack 230. The common physical layer 220 can specify the criteria defining waveform characteristics in the system. Such criteria can include the symbol rate, channel spacing, burst durations, modulation and coding schemes, etc. As a specific example, the common physical layer 220 can set the symbol rate to be 117 ksps with a channel spacing of 156.25 kHz. Modulation schemes could be set as pi/4 QPSK or 16 APSK. Furthermore, burst duration could be 5 ms or 20 ms, and the coding scheme could be Low Density Parity Check codes or Turbo Codes. Accordingly, the base station 200 can receive communication from any terminal type by multiplexing the signals from each terminal type into a single frequency.

The multi-protocol stack 230 facilitates processing of communication (or data packets) from user terminals of different types, or generations. According to the illustrated embodiment, the base station 200 is capable of communicating with 2.5G terminals 270, 3G terminals 280, and 4G terminals 290. The multi-protocol stack 230 can include a plurality of branches that are specifically configured to process data packets received from user terminals of different generations. For example, the multi-protocol stack 230 can include a 2.5G branch 240, a 3G branch 250, and a 4G branch 260. The 2.5G branch 240 includes a medium access control (MAC) layer 242 and a radio link control (RLC) layer 244.

According to the illustrated embodiment, the 3G branch 250 also includes a MAC layer 252 and a RLC layer 254, and the 4G branch 260 includes a MAC layer 262 and a RLC layer 264. The 3G branch 250 and the 4G branch 260 additionally include packet data convergence protocol (PDCP) layers 256 and 266, respectively. Data packets transmitted from the base station 200 are received by the 2.5G user terminals 270, 3G user terminals 280, and 4G user terminals 290, and subsequently processed at corresponding layers. For example, the 2.5G terminal 270 also includes a physical layer 272, a MAC layer 274, and a RLC layer 276. These layers process packets received from the base station 200 in a downlink direction, and prepare packets to be processed by the base station 200 in an uplink direction.

As illustrated in FIG. 2, the 3G terminal 280 also includes a physical layer 282, a MAC layer 284, and a RLC layer 286. In contrast to the 2.5G terminal 270, the 3G terminal 280 also includes a packet data convergence protocol (PDCP) layer 288. The 4G terminal 290 includes a similar layer arrangement, namely a physical layer 292, a MAC layer 294, and a RLC layer 296, and a PDCP layer 298. These layers process packets received by the 3G terminal 280 and the 4G terminal 290 from the base station 200 in a downlink direction, and prepare packets to be processed by the base station 200 in an uplink direction.

According to at least one embodiment, the common physical layer 220 is configured to receive user traffic from all types of user terminals. More particularly, the common physical layer 220 can receive user traffic from current generation user terminals, as well as legacy terminals. For example, the common physical layer 220 receives and processes user traffic from the 2.5G terminal 270, the 3G terminal 280, and the 4G terminal 290. The common physical layer 220 is capable of determining the generation of the particular user terminal transmitting user traffic, and forwarding such user traffic to the appropriate branch of the multi branch protocol stack 230. For example, when a 2.5G terminal 270 establishes a communication link with the base station 200, the common physical layer 210 detects the type of terminal (or generation), and routes the traffic to the 2.5G branch 240. Accordingly, data packets are subsequently processed by the 2.5G MAC layer 242, and the 2.5G RLC layer 244. The 2.5G branch 240 subsequently forwards the data packets to an external core network that is specifically designed to implement 2.5G protocols.

Similarly, when a 3G terminal 280 establishes a communication link with the base station 200, the common physical layer 220 routes the traffic to the 3G branch 250 of the multi-protocol stack 230. More particularly, data packets from the common physical layer 220 are processed by the 3G MAC layer 252, the 3G RLC layer 254, and the 3G PDCP layer 256. The 3G branch subsequently forwards the data packets to an external core network which implements 3G protocols. Communication links established by the 4G terminal 290 arrive at the common physical layer 220, and are routed to the 4G branch 260 of the multi-protocol stack 230. The 4G branch 260 also includes a MAC layer 262, a RLC layer 264, and a PDCP layer 266. Data packets from the 4G user traffic are then directed to a 4G core network.

During normal communications, traffic is also exchanged from the base station 200 to the terminals (270, 280, 290) in a downlink direction. For example, the 4G terminal 290 may establish a communication link in order to access data such as a video file or audio file. The request would reach a particular server on the internet via the base station 200 and the 4G core network. The actual audio or video file would be transmitted from server back to the 4G terminal 290 via the 4G core network and the base station 200. According to at least one embodiment, the audio or video file would be received at the 4G branch 260 of the multi-protocol stack 230. Data packets would be processed and directed to the common physical layer 220. Since the data packets are received directly from the 4G branch 260, the type of terminal involved in the communication, namely the 4G terminal 290, is already known to common physical layer 220. Similarly, traffic from the 2.5G and 3G core networks are received at the 2.5G branch 240 and the 3G branch 250 of the multicore protocol stack 230. The traffic is then forwarded to the common physical layer 220 and routed to the appropriate terminal, e.g., either the 2.5G terminal 270 or the 3G terminal 280.

Figure 3:
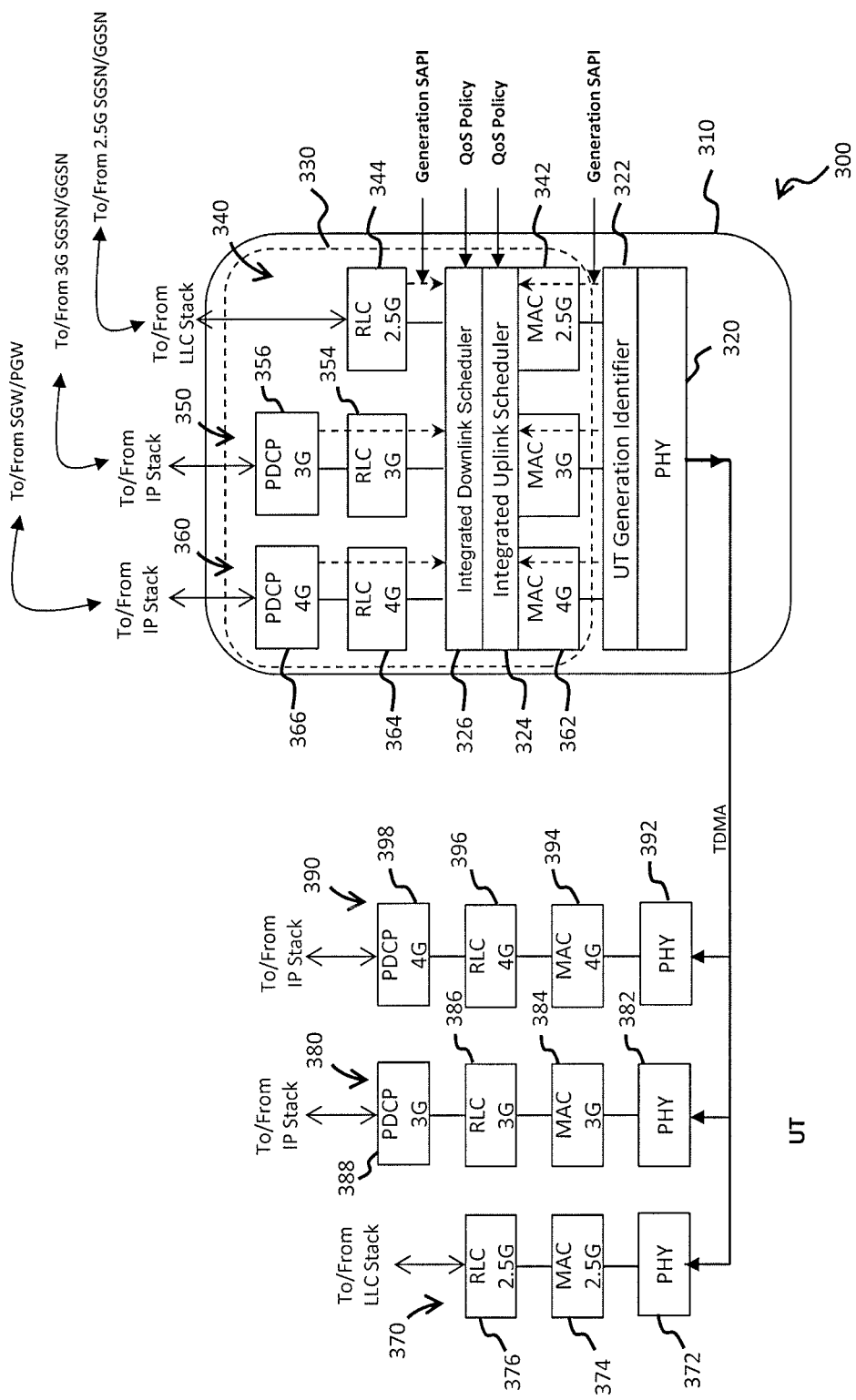
FIG. 3 is a diagram illustrating details of components for establishing communication between a base station and different generation terminals, in accordance with various embodiments.

FIG. 3 illustrates details of various components for establishing communication between a base station and different generation terminals, in accordance with various embodiments. The base station 300 includes a PDAI 310 that functions as an interface for communication signals between the base station 300 and a 2.5G terminal 370, a 3G terminal 380, and a 4G terminal 390. The PDAI layer 310 includes a common physical layer 320, and a multi-protocol stack 330 that facilitates processing of communication (or data packets) from user terminals of different types, or generations. Accordingly, the base station 300 is capable of communicating with 3.5G terminals 370, 3G terminals 380, and 4G terminals 390.

The multi-protocol stack 330 also includes a plurality of branches specifically configured to process data packets received from user terminals of different generations. More particularly, the multi-protocol stack 330 can include a 2.5G branch 340, a 3G branch 350, and a 4G branch 360. The 2.5G branch 340 includes a medium access control (MAC) layer 342 and a radio link control (RLC) layer 344. The 3G branch 350 also includes a MAC layer 352 and a RLC layer 354, as well as a PDCP layer 356. The 4G branch 360 similarly includes a MAC layer 362, RLC layer 364, and PDCP layer 366. Data packets transmitted from the base station 300 are received by the 2.5G user terminals 370, 3G user terminals 380, and 4G user terminals 390, and subsequently processed at corresponding layers. For example, the 2.5G terminal 370 also includes a physical layer 372, a MAC layer 374, and a RLC layer 376. As further illustrated in FIG. 3, the 3G terminal 380 includes a physical layer 382, MAC layer 384, RLC layer 386, and PDCP layer 388. The 4G terminal 390 includes a similar layer arrangement, namely a physical layer 392, a MAC layer 394, and a RLC layer 396, and a PDCP layer 398.

According to various embodiments, the common physical layer 320 is configured to receive user traffic from all types of user terminals, including current generation user terminals and legacy user terminals. For example, the common physical layer 320 can receive and process user traffic from the 2.5G terminal 370, the 3G terminal 380, and the 4G terminal 390. The common physical layer 320 is capable of determining the generation of the particular user terminal transmitting user traffic, and forwarding such user traffic to the appropriate branch of the multi branch protocol stack 330. For example, when a 2.5G terminal 370 establishes a communication link with the base station 300, the common physical layer 310 detects the type of terminal (or generation), and routes the traffic to the 2.5G branch 340. Accordingly, data packets are subsequently processed by the 2.5G MAC layer 342, and the 2.5G RLC layer 344. The 2.5G branch 340 subsequently forwards the data packets to an external core network that is specifically designed to implement 2.5G protocols.

Similarly, when a 3G terminal 380 establishes a communication link with the base station 300, the common physical layer 320 routes the traffic to the 3G branch 350 of the multi-protocol stack 330. Data packets from the common physical layer 320 are, therefore, processed by the 3G MAC layer 352, the 3G RLC layer 354, and the 3G PDCP layer 356. The 3G branch subsequently forwards the data packets to an external core network which implements 3G protocols. Communication links established by the 4G terminal 390 arrive at the common physical layer 320, and are routed to the 4G branch 360 of the multi-protocol stack 330. The 4G branch 360 also includes a MAC layer 362, a RLC layer 364, and a PDCP layer 366. Data packets from the 4G user traffic are then directed to a 4G core network.

According to at least one embodiment, when a terminal is attempting to establish a communication link with the base station 300, a request is transmitted over a common control channel commonly referred to as a random access channel (RACH). The request informs the base station 300 that the terminal requires bandwidth allocation to establish a communication link. According to at least one embodiment, the terminal further includes information in the request that is indicative of its particular generation. For example, if a 2.5G terminal 370 requests bandwidth allocation on the random access channel, information would be inserted within the request message to indicate that the bandwidth will be allocated specifically for the 2.5G terminal 370. Similarly, if a 4G terminal 390 or a 3G terminal 380 request bandwidth allocation on the random access channel, information would be inserted in the request message to specify the type of terminal (i.e., 4G or 3G) that will be utilizing the bandwidth. According to additional embodiments, the terminal may further include information pertaining to the type of traffic that will be exchanged. For example, such information can indicate that the traffic will be voice communication, a data communication, etc.

According to at least one embodiment, when the request is received at the base station 300, the common physical layer 320 can access the additional information to determine the specific type of terminal involved in the communication link. Accordingly, the common physical layer 320 would determine that a 2.5G terminal is involved, and route the traffic to the 2.5G branch 340 of the multi-protocol stack 330. According to at least one embodiment, the base station 300 can also include a terminal generation identifier 322 that is specifically configured to examine various fields in the request for bandwidth to detect the terminal identification information. Information determined by the terminal generation identifier 322 can be shared with the common physical layer 320. Thus, communication links established with either the 2.5G terminal 370, the 3G terminal 380, or the 4G terminal 390 can be correctly identified and routed to the 2.5G branch 340, the 3G branch 350, or the 4G branch 360 of the multi-protocol stack 330, respectively.

According to the illustrated embodiment, the base station 300 includes an integrated uplink scheduler 324 and an integrated downlink scheduler 326. While FIG. 3 illustrates two independent components, it should be noted that various implementations can provide for a single integrated scheduler capable of performing both uplink and downlink data scheduling. The integrated uplink scheduler 324 and the integrated downlink scheduler 326 are capable of accessing information for traffic received from all types of terminals. Thus, uplink and downlink packet scheduling can be based on numerous quality of service (QoS) criteria. According to one embodiment, for example, user traffic may be prioritized based, at least in part, on the type (or generation) of terminal being utilized. For example, user traffic for 4G terminals 390 may be prioritized over user traffic from 3G terminals 380 and 2.5G terminals 370. Similarly, user traffic from 3G terminals 380 may be prioritized over user traffic from 2.5G terminals 370. User traffic may also be prioritized on the type of traffic. For example, voice traffic, which is very sensitive to latency, can be prioritized over conventional data traffic such as web browsing. Furthermore, certain types of data traffic that may require low latency, such as, video or audio streaming, may be prioritized over the transfer of actual video or audio files that do not require near real-time transmission and are less susceptible to delays.

According to at least one embodiment, uplink traffic received from the terminals are identified and tagged by the terminal generation identifier 322. For example, the terminal generation identifier 322 can insert a generation service access point identifier (SAPI) as a tag in the address field of data packets contained in the user traffic. The generation SAPI remains in the address field until the data packets are ready to be forwarded to the external core networks. The generation SAPI allows all the layers within the multi-protocol stack to determine the specific generation or terminal type being used. According to various embodiments, the integrated uplink scheduler 324 can utilize the generation SAPI to determine the type of terminal being used and prioritize packets accordingly.

The integrated downlink scheduler 326 similarly prioritizes packets being transmitted from the base station 300 to the terminals 370, 380, 390. As previously discussed, data from the external core networks is exchanged directly with specific branches of the multi-protocol stack 330. Accordingly, depending on the specific core network being used, data packets will be forwarded to either the 2.5G branch 340, the 3G branch 350, or the 4G branch 360. Since each branch is specific to a particular protocol being used by the terminals, the type is automatically inferred. According to at least one embodiment, the generation SAPI can be inserted in the address field of data packets by the appropriate RLC layer, namely the 2.5G RLC layer 344, the 3G RLC layer 354, or the 4G RLC layer 364. The generation SAPI then remains in the address field until the data packet reaches, for example, the common physical layer 320. This allows the integrated downlink scheduler 326 to access the type of terminal being used for purposes of prioritizing transmissions. According additional embodiments, the 3G PDCP layer 356 and the 4G PDCP layer 366 are configured to insert the generation SAPI in the address field of the data packets. Data packets exiting the multi-protocol stack 330 reach the common physical layer 320, wherein the generation SAPI is removed prior to transmission to the user terminals. According to specific implementations, however, the terminal generation identifier 322 can be configured to remove the generation SAPI from the address field of the packet.

Figure 4:
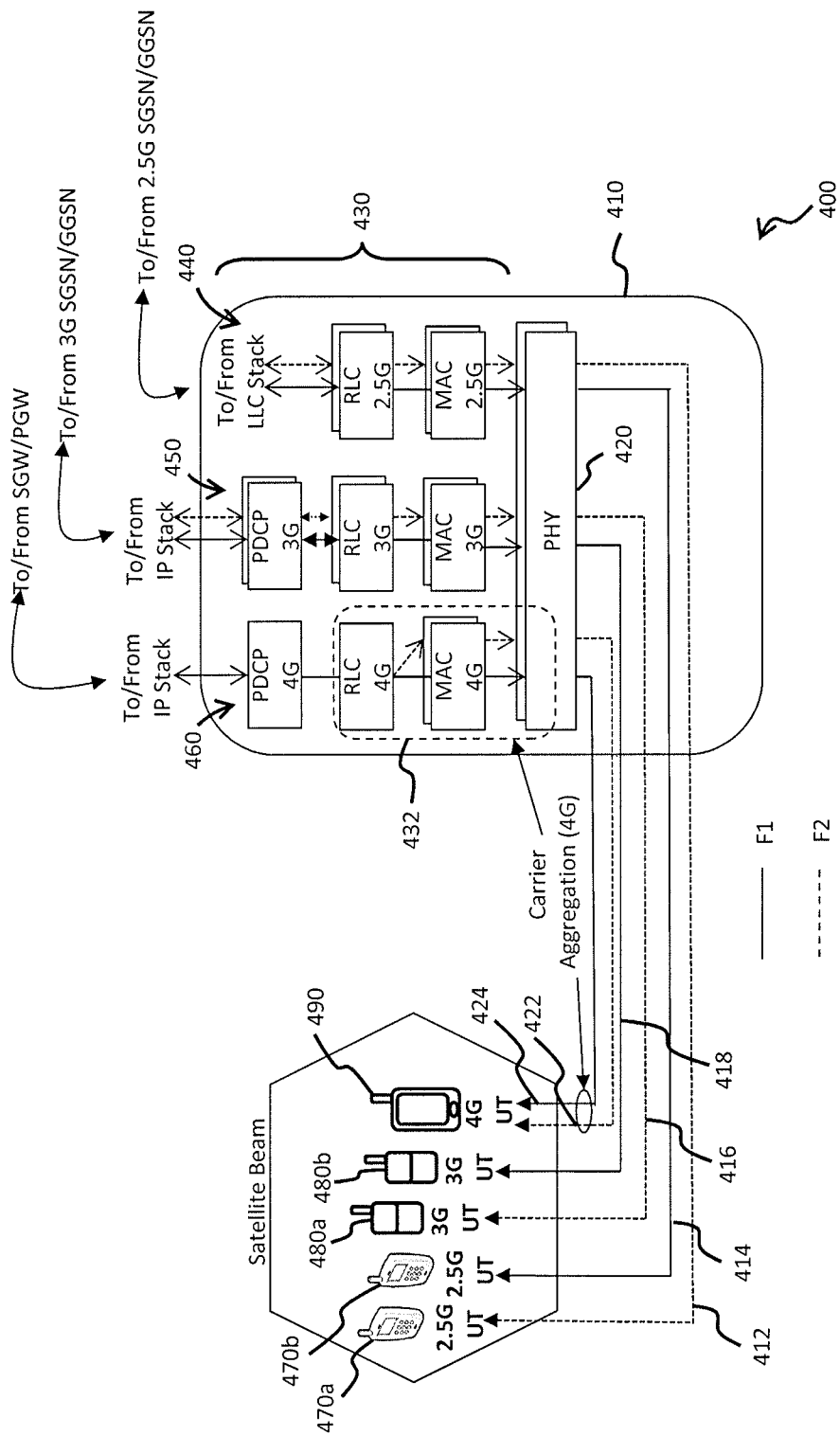
FIG. 4 is a diagram illustrating details for increasing throughput in a communication link, in accordance with at least one embodiment.

FIG. 4 illustrates details for increasing throughput in a communication link, in accordance with at least one embodiment. During normal operation, communication links between the terminals and the base station are using an individual carrier per terminal. For example, FIG. 4 illustrates two frequencies F1 and F2 that are shared by 5 terminals. Specifically, carrier 412 and carrier 414 can facilitate communication links with 2.5G terminals 470a, 470b using frequencies F2 and F1, respectively. Carrier 416 can be used to establish a communication link with a first 3G terminal 480a using frequency F2, while carrier 418 is used to establish a communication link with a second 3G terminal 480b using frequency F1. As further illustrated in FIG. 4, each carrier is managed by an instance of the common physical layer and multi-protocol stack. Depending on the specific implementation, each carrier can be configured to transport a specific level of traffic under ideal conditions. Thus, the maximum amount of traffic that can be exchanged with the 3G terminals 480 will be limited by the specific characteristics of the system as well as the protocol being used. Similarly, the maximum traffic rate available to the 2.5G terminals 470 will be limited by the protocol being used as well as the system configurations.

According to various embodiments, the amount of user traffic being transmitted in the communication link can be increased by aggregating multiple carriers to an individual terminal. This is illustrated with reference to the 4G terminal 490. More particularly, carrier 422 and carrier 424 are used to facilitate communication by the 4G terminal 490 simultaneously at different frequencies. Thus, the amount of throughput available to the 4G terminal 490 would be doubled. While FIG. 4 illustrates two carriers being aggregated to the 4G terminal 490, it should be noted additional carriers can be utilized to further increase the throughput. Accordingly, the use of two carriers is only intended to be illustrative, and not restrictive.

According to various implementations, when a carrier is assigned to facilitate communication with a terminal, an instance 432 of the common physical layer 420 and the multi-protocol stack 430 is utilized to manage traffic flow on the carrier. According to various embodiments, the base station 400 can incorporate multiple instances of the common physical layer 420 and multi-protocol stack 430 in hardware configurations for purposes of managing the different carriers. According to other embodiments, however, virtual implementations of the common physical layer and the multi-protocol stack can be used to manage the carriers that are assigned to different terminals.

Figure 5:
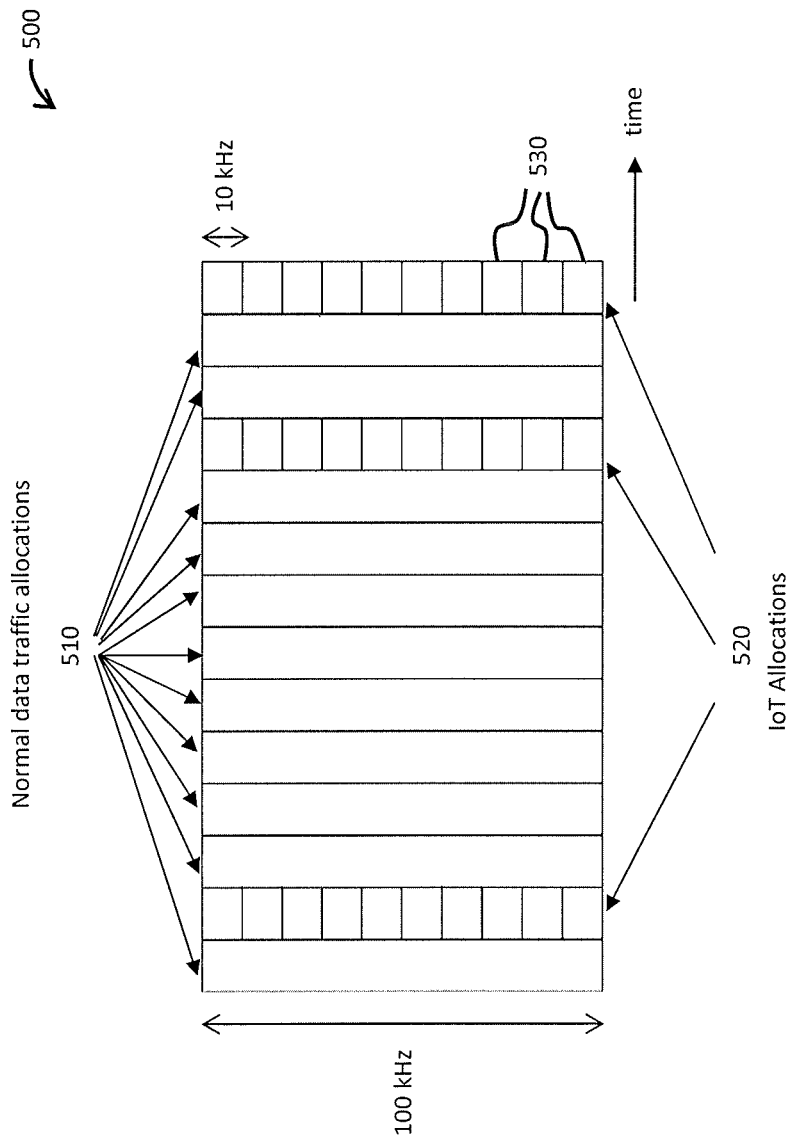
FIG. 5 is a diagram illustrating carrier de-aggregation, according to one embodiment.

FIG. 5 illustrates the manner in which carriers can be de-aggregated, according to one or more embodiments. As previously discussed, certain terminals are capable of supporting devices which fall into the category of IoT devices. While IoT devices are generally low power and low bandwidth devices, they will still require access to the communication link in order to transmit and receive necessary data. Due to the low bandwidth requirements, it may not be efficient to allocate dedicated spectrum for such devices. According to at least one embodiment, IoT traffic and non-IoT traffic are multiplexed in the same spectrum. This can be achieved, at least in part, by utilizing bandwidth that is otherwise unusable due to specific spectrum allocation and carrier bandwidth definitions.

Suppose a particular service provider is allocated three discontinuous blocks of spectrum that are 130 kHz, 112 kHz, and 376 kHz. If carrier bandwidths of 100 kHz are defined, it is not possible to utilize the three blocks of spectrum. The first block will have 30 kHz of unusable bandwidth, second block will have 12 kHz of unusable bandwidth, and third block will have 76 kHz of unusable bandwidth. This results in a total unusable bandwidth of 118 kHz. Given that (a) smaller bandwidths are sufficient to carry low data rate IoT traffic and (b) peak power required with narrower bandwidth carriers is lower compared to wider bandwidth carriers, narrow band carriers, such as, for example 10 kHz bandwidth, can be utilize to carry IoT traffic. Such narrow band carriers can permit very high utilization of available bandwidth, while also minimizing the amount of unusable bandwidth. Using the previous example above, three narrowband IoT carriers can be used in first block, one in the second block, and seven in the third block, thereby resulting in only 8 kHz of unusable bandwidth instead of 118 kHz.

According to at least one embodiment, when 100 kHz carriers are set up to carry internet traffic, IoT traffic is multiplexed on the same 100 kHz spectrum by de-aggregating carriers in uplink transmissions to allow IoT devices that are only capable of transmitting on a 10 kHz narrow band carrier. Referring to FIG. 5, in any given timeslot, transmission is allocated to either a regular data terminal or IoT devices. On a slot where IoT devices are granted permission, up to ten IoT devices can transmit simultaneously in the 100 kHz of spectrum, with each IoT device transmitting on the 10 kHz narrow band carrier. As illustrated in FIG. 5, each time slot utilizes 100 kHz of spectrum. Normal data traffic allocations 510 occupy the 100 kHz spectrum without de-aggregation. In order to accommodate the IoT traffic, however, the 100 kHz time slots are de-aggregated to form IoT allocations 520 capable of carrying ten narrow band carriers 522 of 10 kHz.

Figure 6:
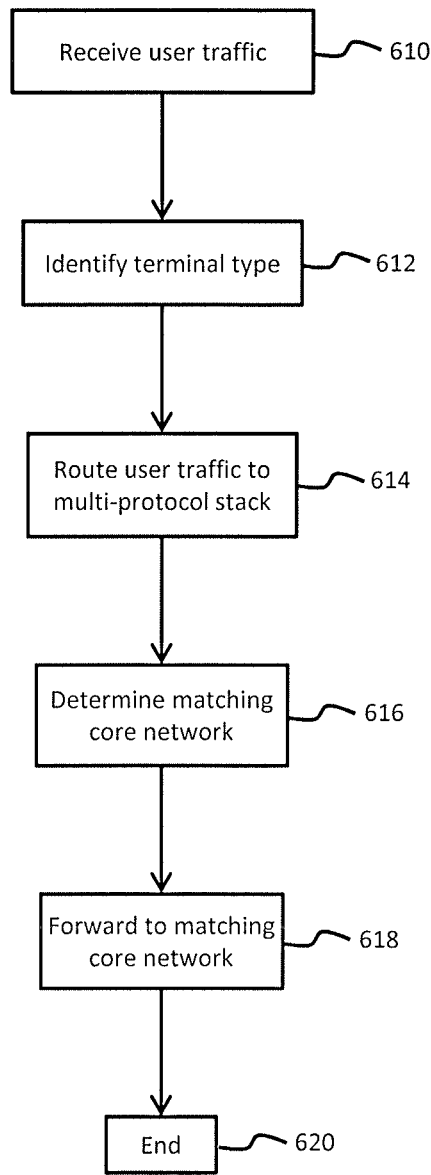
FIG. 6 is a flowchart of a process for uplink communication, according to one embodiment.

FIG. 6 is a flowchart illustrating uplink communication in accordance with at least one embodiment. At 610, user traffic is received. This can correspond, for example, to a user utilizing a terminal such as a 4G terminal to establish a communication link with the base station. At 612, the terminal type is identified. As previously discussed, various types of terminals can be utilized in the satellite communication system. Each terminal operates using a different protocols corresponding to its generation, or type. The functionality of a particular terminal can also be limited by the specific hardware used to control various operations of the terminal. Accordingly, it should be determined whether the communication link is being established with a 2.5G terminal, a 3G terminal, a 4G terminal, etc. At 614, the user traffic is routed to a multiprotocol stack. Depending on the specific implementation, the multi-protocol stack can include specific configurations that allow it to process data packets received from different generations of terminals. For example, if a 2.5G terminal is being utilized, the multiprotocol stack would utilize layers and components that are intended to facilitate communication with a 2.5G terminal. Similarly, if the communication link is established with a 4G terminal, the multiprotocol stack would utilize layers and components that allow it to communicate with the 4G terminal and process received data packets.

At 616, a matching core network is identified. Core networks are generally designed and deployed for interacting with specific generations of wireless protocols. Core networks are, therefore, not able to interact with terminals or hardware operating on different protocols. For example, an external core network deployed to support 4G communications would not be able to process data packets received from a 2.5G terminal, or vice versa. According to various embodiments, the multiprotocol stack determines the matching core network based on the type that has been identified for the terminal using in the communication link. Thus, the multi-protocol stack can establish a link to the proper core network. At 618, user traffic from the terminal is forwarded to the matching core network. The process ends at 620.

Figure 7:
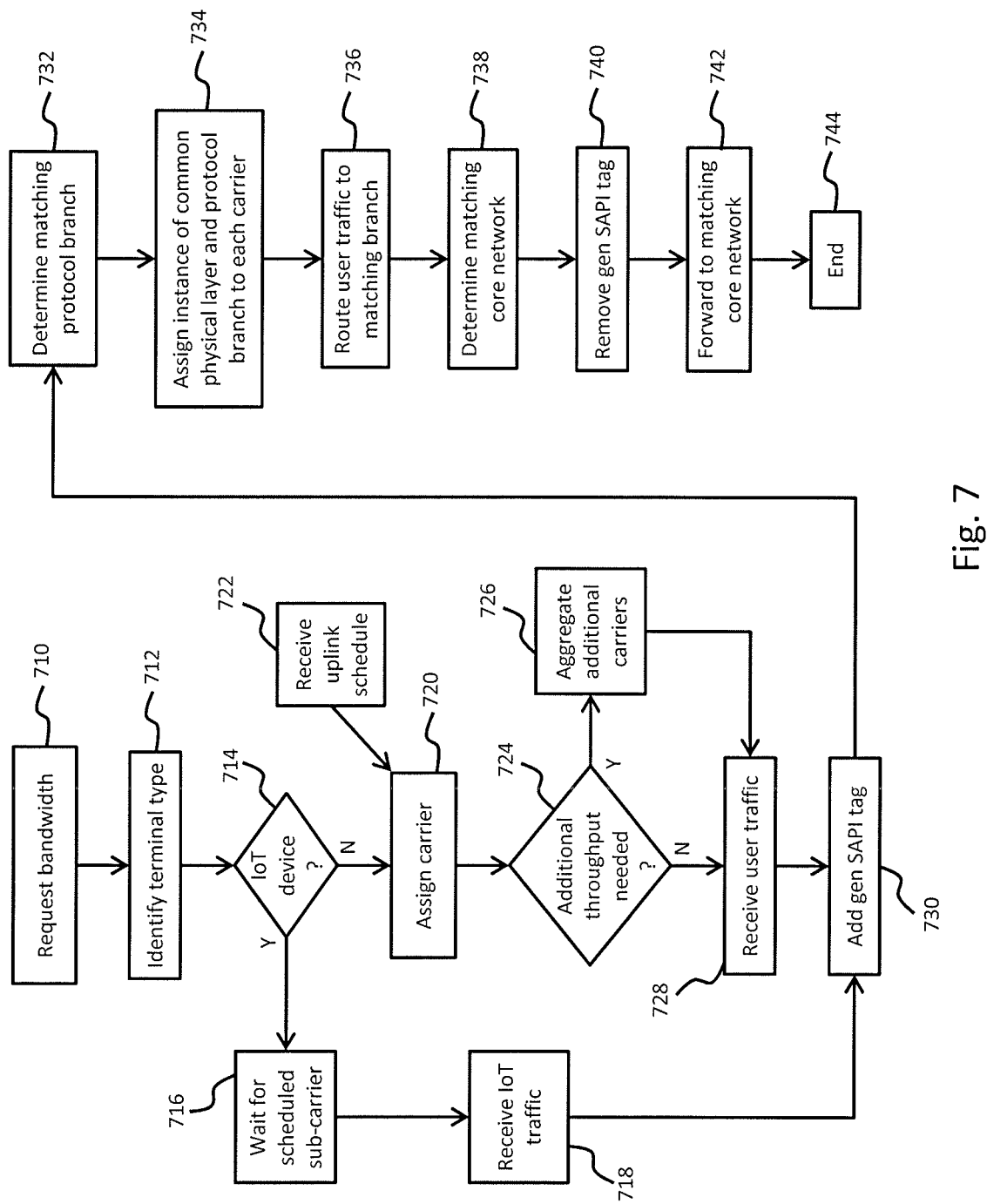
FIG. 7 is a flowchart of a process for uplink communication, in accordance with various embodiments.

FIG. 7 is a flowchart illustrating uplink communication from a terminal in accordance with various embodiments. And 710, the terminal transmits a request for bandwidth to be allocated for a communication session. This can correspond, for example, to accessing a common random access channel recognized by the base station and other components of the satellite communication system. The request indicates to the base station that the terminal requires bandwidth to transfer information (e.g., voice, data, etc.). At 712, the terminal type and/or traffic type is identified. According to an embodiment, the terminal can include information within the bandwidth request to indicate the particular protocol being used, as well as and generation of the terminal. Furthermore, the terminal can indicate the type of traffic for which the bandwidth is being requested. For example, the terminal may be requesting the bandwidth to establish a voice communication link. The terminal can also indicate that bandwidth is desired to establish a data link for downloading audio/video, streaming audio/video, etc.

Depending on the specific communication system, certain terminals may be in the form of fixed terminals configured to provide communication links to multiple customer premise equipment (e.g., laptop, computer, tablet, IoT devices, etc.). Such devices will generally access the internet via the terminal. According to at least one embodiment, the bandwidth request can also indicate whether the traffic originates from IoT devices. Thus, at 714, it is determined whether the traffic type originates from an IoT device. If the bandwidth is being requested for and IoT device, control passes to 716. The base station waits until an appropriate narrow band carrier can be scheduled to carry the IoT traffic. According to at least one embodiment, the uplink scheduler can utilize various parameters to determine when timeslots allocated for a de-aggregated carrier can be utilized to carry the IoT traffic at 718. Control would then pass to 730.

If it is determined that the requested bandwidth will not be used to carry user traffic from IoT devices, control passes to 720. A carrier is assigned to the terminal for the bandwidth required for the user traffic. According to at least one embodiment, the user traffic may be routed based on priority, quality of service, and other criteria. Thus, at 722, and uplink schedule can be received from the integrated uplink scheduler and applied to route the data packets. According to additional embodiments, parameters such as the generation of the terminal, subscription pricing, priority, etc. can be used to determine whether a terminal qualifies for, or is capable of, supporting additional throughput. For example, a customer may subscribe to a plan which guarantees a particular amount of bandwidth. Depending on the specific system implementation and/or transmission parameters, a single carrier may not be adequate for supporting the quality of service required by the customer's plan. At 724 it is determined whether additional throughput is needed or available for the terminal. If additional throughput is required, control passes to 726. Additional carriers are aggregated in order to increase the amount user traffic. For example, if a second carrier is aggregated to carry user traffic from the terminal, the allocated bandwidth can be doubled relative to a single carrier. Similarly, if 2 or 3 additional carriers are aggregated and assigned to the terminal, the bandwidth can be tripled or quadrupled, respectively.

At 728, the user traffic is received. This can correspond, for example, to the common physical layer receiving data packets from the IP flow (or flows) being transmitted from the terminal. At 730, a generation SAPI tag is added to data packets being received from the terminal. The generation SAPI tag can be added, for example, to the address field of some, or all, data packets received at the common physical layer. According to at least one embodiment, a terminal generation identifier can be incorporated within the base station, and configured to add the generation SAPI to the data packets. At 732, a matching protocol branch within the multi-protocol stack is determined for the user traffic. For example, if the user traffic originates from a 4G terminal, the 4G protocol branch would be selected as the matching branch.

During the communication session, data packets and various parameters must be monitored and processed in order to ensure proper delivery. At 734, an instance of the common physical layer and protocol branch is assigned to each carrier supporting the user traffic. Depending on the specific implementation, the instance of the common physical layer and protocol branch can be provided via hardware or virtually. More particularly, the base station can include multiple interfaces containing the common physical layer and multiprotocol stack. Each carrier assigned to the terminal can be assigned to a physical layer and multi-protocol stack that is implemented by hardware. According to other embodiments, however, the hardware used to implement the common physical layer and multiprotocol stack can include sufficient logic, processing components, memory, etc. to spawn multiple virtual instances of the common physical layer and multiprotocol stack.

According to at least one embodiment, if multiple carriers are assigned to the terminal, a single common physical layer and multiprotocol stack that are implemented by hardware can be used to manage the first carrier, and spawn multiple virtual instances to support additional carriers aggregated to provide the increased bandwidth to the terminal. At 736, user traffic is routed to the matching protocol branch. At 738, the matching core network is determined for the user traffic. For example, if the user traffic originates from a 4G terminal, then the matching core network would be one which supports 4G traffic. At 740, the generation SAPI is removed from any data packets. The data packets subsequently forwarded to the matching core network at 742. The process and at 744.

Figure 8:
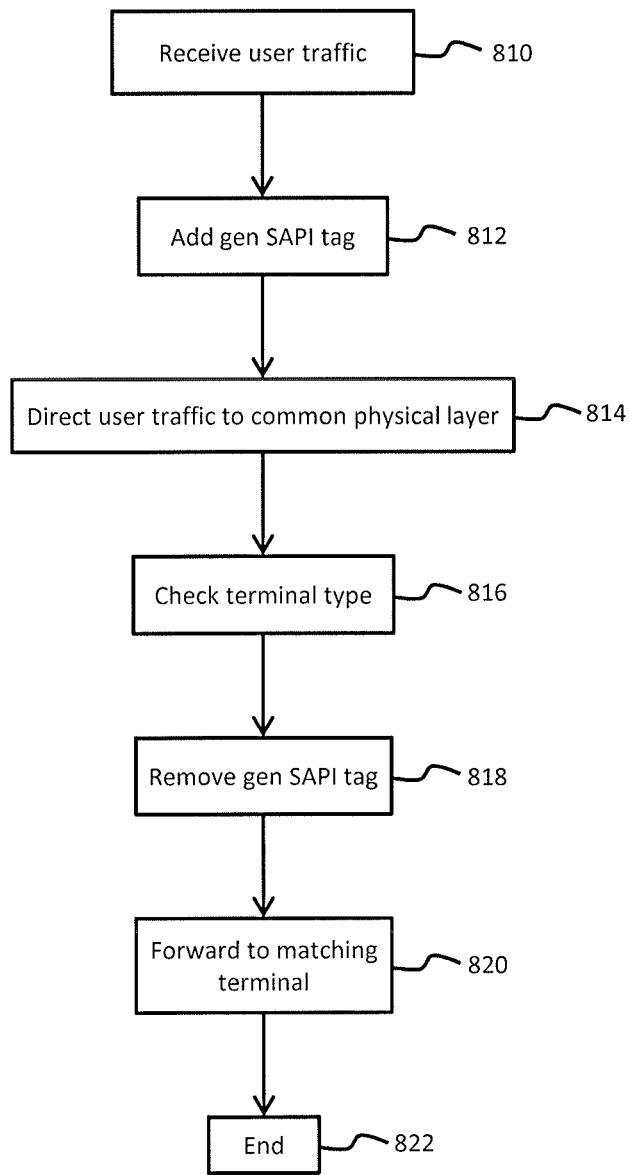
FIG. 8 is a flowchart of a process for downlink communication, according to one embodiment.

FIG. 8 is a flowchart illustrating downlink communication in accordance with at least one embodiment. At 810, user traffic is received. This corresponds, for example, to traffic being received from the appropriate core network. For example, if the user traffic requested a file from a remote server, a response containing the file would subsequently be returned to the terminal. The downlink user traffic received from the external core network is received by the corresponding branch of the multiprotocol stack. At 812, a generation SAPI is added to the address field of packets received from the external core network. As previously discussed, the external core networks communicate directly with specific branches of the multi-protocol stack. Therefore, if a 4G core network transmits the user traffic, the type of traffic is inferred upon receipt by the 4G branch of the multi-protocol stack. It is therefore, not necessary to supply any identification information with the packets to determine the particular type of terminal for which the user traffic is intended. At 814, the user traffic is directed to the common physical layer. At 816, the terminal type is checked. This can be done, for example, by accessing the address field of the data packets. At 818, the generation SAPI is removed from the address field of any packets received from the multi-protocol stack. According to at least one embodiment, this can be done at the common physical layer. According to other embodiments, however, a terminal generation identifier can be incorporated in the PDAI to remove the generation SAPI. At 820, the user traffic is forwarded to the matching, or intended, terminal. The process ends at 822.

Figure 9:
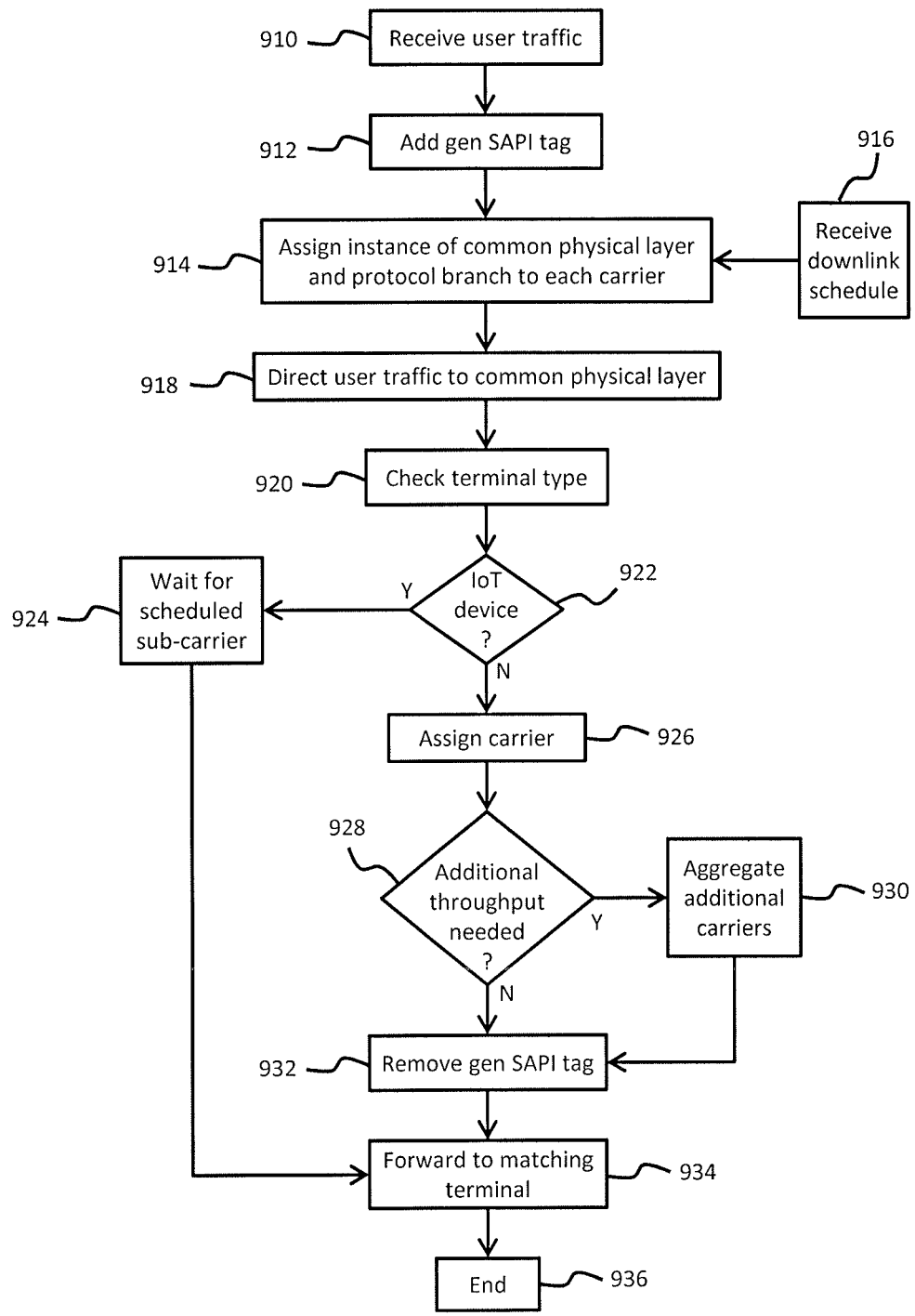
FIG. 9 is a flowchart illustrating downlink communication, according various.

FIG. 9 is a flowchart illustrating downlink communication in accordance with various embodiments. At 910, user traffic is received, for example, from an external core network that matches the terminal generation (or type) being used in the communication link. The traffic is received at an appropriate branch of the multi-protocol stack. If a 4G terminal is being used, then the user traffic would be received from a 4G core network via the 4G branch of the multiprotocol stack. At 912, a generation SAPI is added to data packets received from the external core network. As previously discussed, the generation SAPIs can be added to the address field of some, or all, data packets that are received. According to at least one embodiment, the PDCP layer can be configured to add the generation SAPI if the user traffic is associated with a 3G terminal or a 4G terminal. If the user traffic is associated with a 2.5G terminal, however, the RLC layer of the 2.5G branch of the protocol stack can be configured to add the generation SAPI. According to still further embodiments, the RLC layer can be configured to add the generation SAPI tag, for all terminals.

At 914, an instance of the common physical layer and protocol branch is assigned to each carrier being used by the terminal. Additionally, a downlink schedule can be received from the integrated downlink scheduler at 916. While FIG. 9 illustrates an instance of the common physical layer and protocol branch being assigned to each carrier, it should be noted that various implementations can utilize the same assignment until the communication session is terminated. More particularly, once the terminal establishes a communication link with the base station, the common physical layer and multiprotocol stack managing the communication link remains the same for uplink and downlink communication until the session is concluded.

At 918, the user traffic is directed to the common physical layer. At 920, the terminal type is checked, for example, by accessing the address field of the data packets. At 922, it is determined whether the user traffic is for and IoT device. If the user traffic is destined for an IoT device, control passes to 924. The user traffic is held until an appropriate narrow band carrier can be scheduled to carry the user traffic. Control would then pass to 934. If the user traffic is not associated with an IoT device, control passes to 926. A narrow band carrier is assigned to carry the user traffic. At 928, it is determined whether additional throughput is needed or required by the terminal. If additional throughput is required, then additional carriers can be aggregated to increase the throughput at 930. Depending on the specific embodiment, additional instances of the common physical layer and protocol branch can also be assigned to each additional carrier that is aggregated. According to other implementations, however, the instances of the common physical layer and protocol branch can be maintained until the communication session ends. At 932, the generation SAPI is removed from the address field of all incoming data packets. Depending on the specific implementation, the generation SAPI can be removed by the common physical layer, the terminal generation identifier, or other appropriate component. At 934, the user traffic is forwarded to the terminal. The process ends at 936.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described PDAI, uplink/downlink scheduler, RLC, PDCP, user terminals, etc. Additionally, such hardware can be interfaced to connect and/or facilitate communication between different components such as PDAI, base station and/or CPU.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 10:
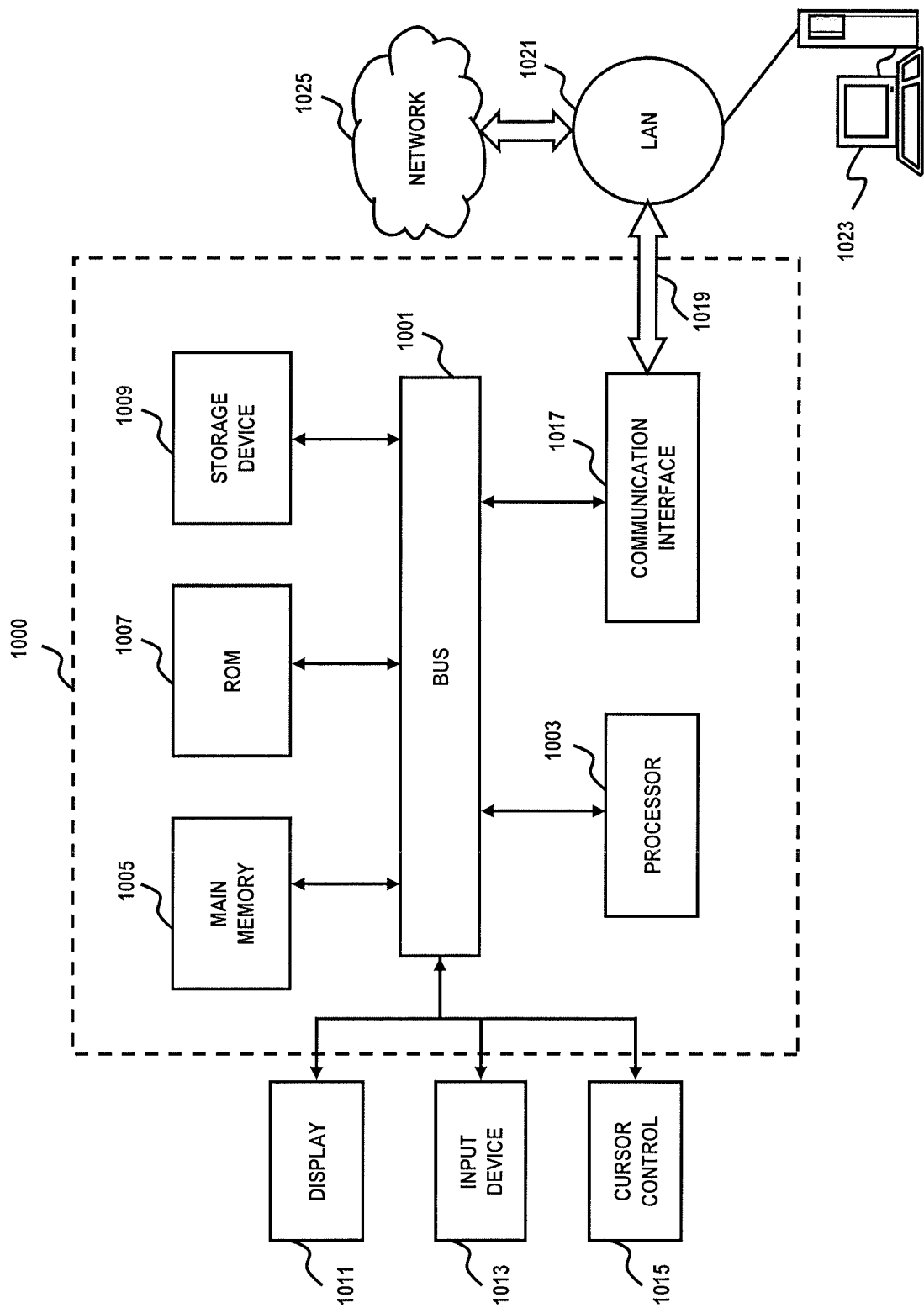
FIG. 10 is a diagram of a computer system that can be used to implement various exemplary embodiments.

FIG. 10 is a diagram of a computer system that can be used to implement features of various embodiments. The computer system 1000 includes a bus 1001 or other communication mechanism for communicating information and a processor 1003 coupled to the bus 1001 for processing information. The computer system 1000 also includes main memory 1005, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a light emitting diode (LED) or other flat panel displays, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011. Additionally, the display 1011 can be touch enabled (i.e., capacitive or resistive) in order facilitate user input via touch or gestures.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a High Definition Multimedia Interface (HDMI), etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 such as a wide area network (WAN) or the Internet. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Non-volatile media can further include flash drives, USB drives, microSD cards, etc. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 11:
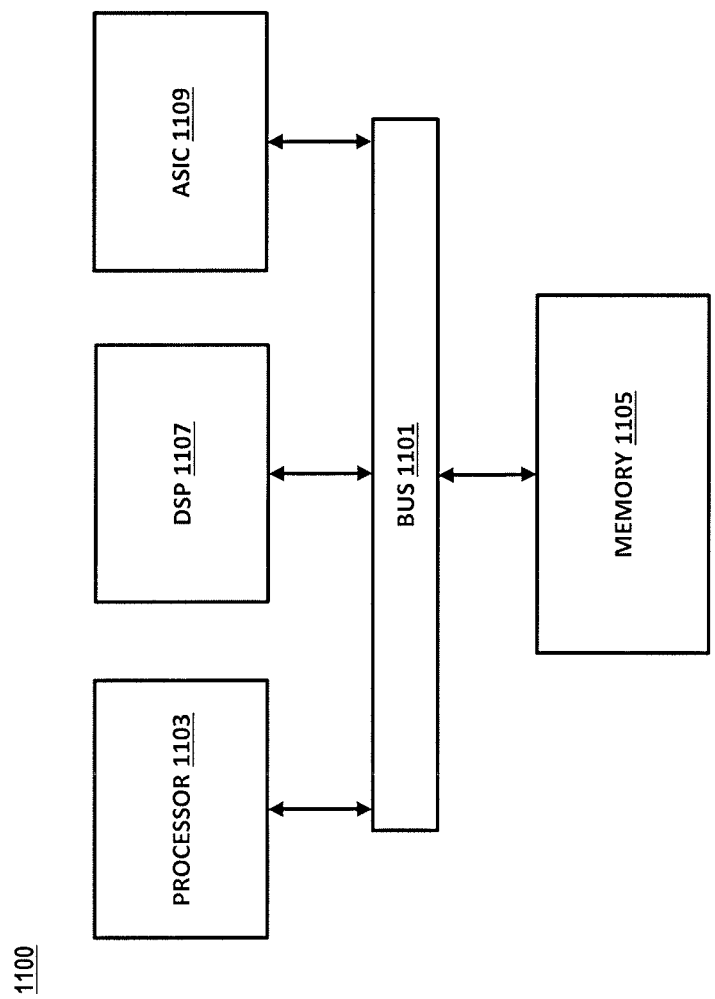
FIG. 11 is a diagram of a chip set that can be used to implement various exemplary embodiments.

FIG. 11 illustrates a chip set 1100 upon which features of various embodiments may be implemented. Chip set 1100 is programmed to implement various features as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of the figures.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 1105 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    receiving user traffic in a satellite communication system from terminals of different types through a common physical layer;
    identifying a type associated with each terminal;
    routing the user traffic from the common physical layer to a multi-protocol stack based, at least in part, on the terminal type; and
    forwarding the user traffic from the multi-protocol stack to a core network corresponding to the terminal type,
    wherein the terminal type is determined based on utilization of a current generation protocol or a legacy protocol of at least one prior generation.

2. The method of claim 1, wherein receiving user traffic further comprises receiving channel requests for bandwidth allocation from the terminals, each channel request message including at least information indicative of the terminal type.

3. The method of claim 1, further comprising dynamically allocating spectrum in coverage beams of the satellite communication system based, at least in part, on a load of the user traffic.

4. The method of claim 1, wherein the multi-protocol stack includes an independent protocol branch for processing the user traffic in accordance with the generation protocol used by each terminal type.

5. The method of claim 1, wherein receiving user traffic further comprises:
    assigning at least one carrier to accommodate the user traffic from each terminal; and
    managing each carrier with a physical or virtual instance of the common physical layer and the multi-protocol stack.

6. The method of claim 1, further comprising:
    generating an integrated uplink schedule across all user traffic; and
    receiving the user traffic in accordance with the integrated uplink schedule.

7. The method of claim 6, wherein the integrated uplink schedule is generated based, at least in part, on the terminal type, terminal backlog, traffic type, quality of service policy, or a combination thereof.

8. The method of claim 1, wherein the common physical layer adds a generation Service Access Point Identifier (SAPI) tag in an address field of data packets contained in the user traffic.

9. The method of claim 8, wherein the generation SAPI tag is removed prior to forwarding the user traffic to the core networks.

10. The method of claim 1, further comprising increasing throughput of at least one terminal by aggregating carriers to carry user traffic from the at least one terminal.

11. The method of claim 10, wherein increasing throughput further comprises transmitting one or more IP flows of user traffic from the at least one terminal on multiple carriers.

12. The method of claim 1, further comprising:
    de-aggregating at least one carrier into multiple narrow-band carriers having equal bandwidth; and
    transmitting at least one of low data rate user traffic or delay tolerant user traffic on the narrow-band carriers.

13. The method of claim 12, wherein a time slot is allocated on a transmit frame for either the at least one carrier or the multiple narrow-band carriers.

14. An apparatus comprising:
    a multi-protocol stack for processing user data using different protocols; and
    a common physical layer configured to:
        receive user traffic from terminals of different types in a satellite communication system,
        identify a type associated with each terminal, and
        route the user traffic to the multi-protocol stack based, at least in part, on the terminal type,
    wherein the multi-protocol stack configured to forward the user traffic to a core network corresponding to the terminal type, and
    wherein the terminal type is determined based on utilization of a current generation protocol or a legacy protocol of at least one prior generation.

15. The apparatus of claim 14, wherein the common physical layer is further configured to receive channel request messages for bandwidth allocation from the terminals, each channel request message including at least information indicative of the terminal type.

16. The apparatus of claim 14, further comprising one or more processors configured to dynamically allocate spectrum in coverage beams of the satellite communication system based, at least in part, on a load of the user traffic.

17. The apparatus of claim 14, wherein the multi-protocol stack includes an independent protocol branch for processing the user traffic in accordance with the generation protocol used by each terminal type.

18. The apparatus of claim 14, further comprising:
    a plurality of physical or virtual instances of both the common physical layer and the multi-protocol stack,
    wherein at least one carrier is assigned to accommodate the user traffic from each terminal, and
    wherein each carrier is managed by a physical or virtual instance of the common physical layer and the multi-protocol stack.

19. The apparatus of claim 14, further comprising:
    an uplink scheduler for generating an integrated uplink schedule across all the user traffic,
    wherein the common physical layer is further configured to receive user the traffic in accordance with the integrated uplink schedule.

20. The apparatus of claim 19, wherein the integrated uplink schedule is generated based, at least in part, on the terminal type, terminal backlog, traffic type, quality of service policy, or a combination thereof.

21. The apparatus of claim 14, wherein the common physical layer is further configured to add a generation SAPI tag in an address field of data packets contained in the user traffic.

22. The apparatus of claim 21, wherein:
    the multi-protocol stack includes at least one of a packet data convergence protocol (PDCP) layer and a radio link control (RLC) layer; and
    the generation SAPI tag is removed at the PDCP layer or the RLC layer prior to forwarding the user traffic to the core networks.

23. The apparatus of claim 14, wherein the common physical layer is further configured to increase throughput of at least one terminal by aggregating carriers to carry user traffic from the at least one terminal.

24. The apparatus of claim 23, wherein the common physical layer is further configured to increase throughput by assigning one or more IP flows of user traffic from the at least one terminal to multiple carriers.

25. The apparatus of claim 14, wherein the common physical layer is further configured to:
- de-aggregate at least one carrier into multiple narrow-band carriers having the same bandwidth; and
- receive at least one of low data rate user traffic and delay tolerant user traffic on the narrow-band carriers.

26. The apparatus of claim 25, wherein a time slot is allocated on a transmit frame for either the at least one carrier or the multiple narrow-band carriers.

\* \* \* \* \*